Figure 1:
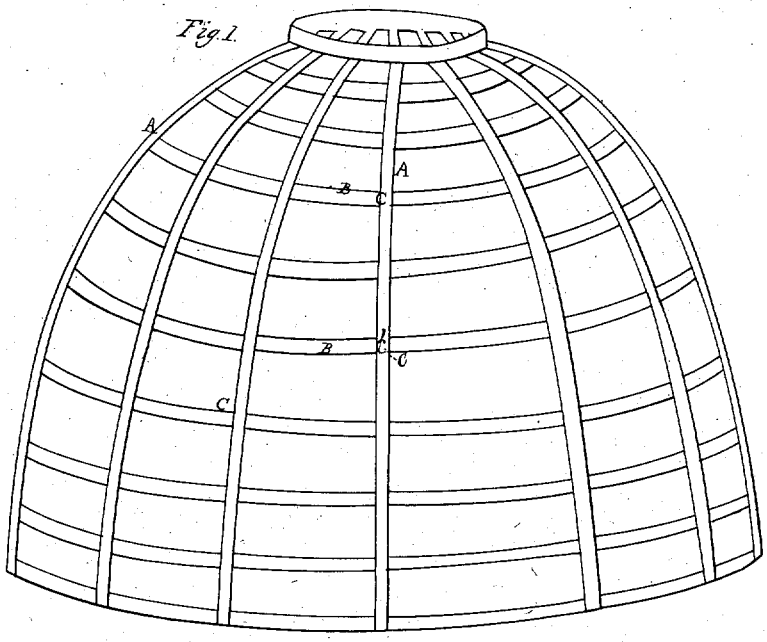

J. Draper.

Hoop Skirt.

No 870 Reissued Dec. 27, 1859.

Witnesses:
W. E. Smith
William Hodge

Inventor
J. Draper

UNITED STATES PATENT OFFICE.

JAMES DRAPER, OF NEW YORK, N. Y., ASSIGNOR TO HIMSELF AND S. H. DOUGHTY, ASSIGNORS TO THEMSELVES AND JAMES BROWN AND WM. KING.

SKELETON SKIRT.

Specification forming part of Letters Patent No. 25,701, dated October 4, 1859; Reissued December 27, 1859, No. 870; again Reissued August 1, 1865, No. 2,046.

*To all whom it may concern:*

Be it known that I, JAMES DRAPER, of the city, county, and State of New York, have invented a certain new and Improved Construction of Skeleton Skirts; and I do hereby declare that the following is a full and exact description of the same, which I have prepared with a view to the obtaining of Letters Patent therefor, and that the same is illustrated in the accompanying drawings, forming a part of this specification.

My invention consists in a new manufacture of skeleton skirt in which the hoops are secured by glue or equivalent fastening between separately woven parts of the tapes, the tapes being woven singly between the hoops and separately as distinct tapes at the points where the hoops are received.

My invention is applicable to all sizes and varieties of skeleton skirts. It is superior to other manufactures inasmuch as it confines the hoops between the parts instead of on the side of a single ordinary tape.

To enable others skilled in the art to make and use my invention, I will proceed to describe it by the aid of the drawings.

I prefer for some reasons to produce my skirts by weaving them with the hoops in place. To do this I construct the loom with the ends or swords of the lay so curved as to allow a hoop to project beyond it and attach all the shuttle guides to one sole or shell of the lay so as to leave a clear space extending quite across and quite back to the reeds. I then hang the lay at such a point above or below that as it swings back to make a shot the shuttle shall traverse properly between the sheds and as it is swung forward to beat up a thread the shuttles and shuttle guides shall pass entirely below or above the plane of the tapes. A hoop may then be inserted after the two independent parts of each tape have been completely woven and before they are joined together, and the parts being then immediately joined, the next thread of the weft is beaten up against the hoop so as to make a very snugly fitted contact of the tape quite around the hoop. I can, however, if the loom is not adapted for such work, weave the tapes in a similar manner except that the hoops are not inserted while the tapes are in the loom, and after their removal from the loom I can insert the hoops thrusting them through each tape singly. In such cases I make the spaces therefor larger than the hoops, so that the latter can be easily inserted, I adjust the tapes properly on the hoops by hand and then cement each tape to each hoop at the point where they intersect. The glue when it hardens causes the two parts to adhere very strongly and to resist all forces tending to induce any improper movement of the parts relatively to each other.

Figure 2:
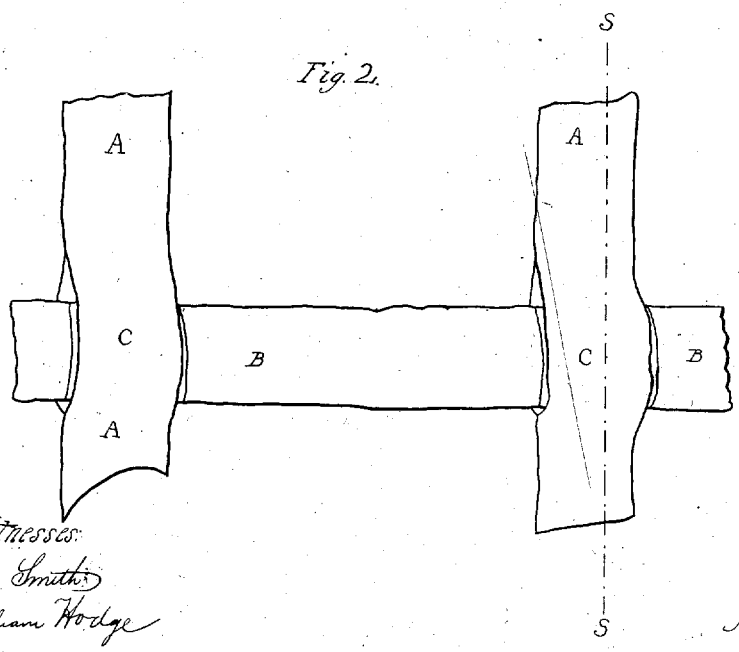
Figure 3:
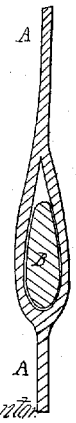

Figure 1 shows my skirt complete, A A being the tapes, B B the hoops and C C the joints or intersections, Fig. 2 shows a perspective view of the joints on a much larger scale, and Fig. 3 shows a section taken on the line S S in Fig. 2.

Similar letters of reference denote like parts in all the drawings.

The red portion D indicates the glue or equivalent cement which must be applied while in a soft state and the parts must remain in contact for a sufficient period to allow the cement to harden before they are subjected to any force tending to separate or move them relatively to each other. They then become very securely united and may be used in the same manner as any other skeleton skirts. Any cement which will adhere strongly to both A and B, may be used in lieu of glue if preferred.

Having now fully described my invention what I claim as new therein and desire to secure by Letters Patent is—

The new manufacture of skeleton skirt herein described in which the hoops B are fastened between separately woven parts of the tapes substantially as herein described, when the parts are woven together as single tapes between the hoops and separately as distinct tapes at the points where the hoops are received.

In witness whereof I have hereunto set my hand.

J. DRAPER.

Witnesses:
G. H. BABCOCK,
THOMAS D. STETSON.

[FIRST PRINTED 1911.]